March 1, 1966 W. R. JOHNSON 3,237,831

TRANSDUCING SYSTEM HAVING DAMPING MEANS FOR CONSTANT SPEED CONTROL

Filed Jan. 9, 1963

3 Sheets-Sheet 1

INVENTOR:
Wayne R. Johnson

By Smyth, Roston & Pavitt
Attorneys

March 1, 1966 W. R. JOHNSON 3,237,831

TRANSDUCING SYSTEM HAVING DAMPING MEANS FOR CONSTANT SPEED CONTROL

Filed Jan. 9, 1963

3 Sheets-Sheet 2

INVENTOR:
Wayne R. Johnson

By Smyth, Roston & Pavitt

Attorneys

INVENTOR:
Wayne R. Johnson
By Smyth, Roston & Pavitt
Attorneys 3,237,831
TRANSDUCING SYSTEM HAVING DAMPING MEANS FOR CONSTANT SPEED CONTROL Wayne R. Johnson, Los Angeles, Calif., assignor to Minnesota Mining and Manufacturing Company, St. Paul, Minn., a corporation of Delaware Filed Jan. 9, 1963, Ser. No. 250,275
11 Claims. (Cl. 226—178)

This invention relates to a tape-transport mechanism for driving a tape with a loop of the traveling tape directed under tension past a transducer station for recording and reproducing signals and is directed to the problem of keeping the tape traveling in the region of the transducer station at a constant speed free from disturbances.

Departures of a traveling magnetic tape from constant speed and accurate alignment in the region of a transducing station affects the signals that are impressed on the tape and again affects the reproduction of the recorded signals. Erratic behavior of the tape becomes serious when a high degree of accuracy is mandatory in high speed recording and especially so when multiple channels of signals are recorded on the tape.

Typically, a tensioned loop of a traveling tape is formed in the region of a transducer station by a power-driven capstan with the assistance of a pair of pucks or nip rollers and with the cooperation of a reversing capstan. One run of the tensioned loop travels from the drive capstan to the idler roller where the direction of the tape is reversed and the other run of the loop travels from the idler roller back to the capstan. A transducer station may comprise a row of four transducer heads which may be positoned adjacent either leg of the tensioned loop but is usually positioned adjacent the outgoing run that travels back from the idler roller to the drive capstan.

It has been found that erratic behavior of such a tensioned tape loop may arise from a number of causes and sources. The tape itself serves as a medium for transferring disturbances to the transducing station originating both in the pay-out reel and in the take-up reel. In addition, tape flutter tends to be created for various reasons within the tensioned loop of the tape. For example, exceedingly small degrees of eccentricity of either the drive capstan or the idler roller will create disturbing vibratory forces.

The drive capstan must be connected to some kind of a prime mover such as an electric motor and, of course, receives various disturbances originating in the prime mover. The drive capstan must be mounted on a drive shaft journalled in suitable bearings and the capstan receives vibratory forces created by the bearings. It has been found, for example, that in the absence of effective counter measures, a minute scratch on a single ball in an anti-friction bearing for the capstan shaft creates vibration of sufficient force and amplitude to defeat the desired constant speed of the tape. If the drive shaft on which the capstan is mounted is a cantilever shaft, i.e., a shaft with bearings on only one end, the shaft itself may flex in a vibratory manner.

If a tachometer used for a servo-loop is operatively connected with the drive capstan, the tachometer may generate disturbances that are communicated to the capstan. The idler roller at the outer end of the tensioned loop must be journalled in some anti-friction bearing arrangement which inevitably creates additional disturbances in close proximity to the transducer station.

It is also to be noted that since the traveling tape has appreciable compliance or longitudinal resiliency, it acts like a single tensioned spring along one run of the loop between the drive capstan and the idler roller and along the other run of the loop acts like a series of springs between the successive transducer heads as well as between the drive capstan and one transducer head and between the idler roller and another transducer head. Such a spring arrangement both transmits and modifies the created disturbances.

The problem then, is to transport the tape at a constant speed within exceedingly narrow limits of error in the face of these diverse disturbances, all of which have effects of exceedingly large magnitude in comparison with the permitted narrow limits of error.

The solution to the problem is found in a combination of various provisions which work together to narrow the departures from a constant rate of tape travel to keep the departures within the required exceedingly narrow margin.

One provision is to minimize the generation of disturbances at their various sources. Exceedingly fine accuracy is sought in fabricating and assembling the parts of the tape-transport mechanism and great care is taken to achieve close concentricity and dynamic balance of all rotating parts.

Another provision is to dampen the unavoidable disturbances as effectively as possible. For this purpose internal damping is incorporated both in the drive capstan and in the cooperating idler roller and additional external damping is provided at the drive capstan. Further provision is to confine the tape in a stable manner on one side of the tensioned loop, the traveling tape being confined to a desired path by fixed guide means. The transducer station is on the other side of the tensioned loop and each of the transducer heads in this zone is provided with external damping. All of these provisions of internal and external damping together with the tape-confining guide on one side of the tensioned loop combine to make the transducer station a relatively quiescent or "dead" zone.

The features and advantages of the invention may be understood from the following detailed description, together with the accompanying drawings.

In the drawings, which are to be regarded as merely illustrative:

Figure 1:
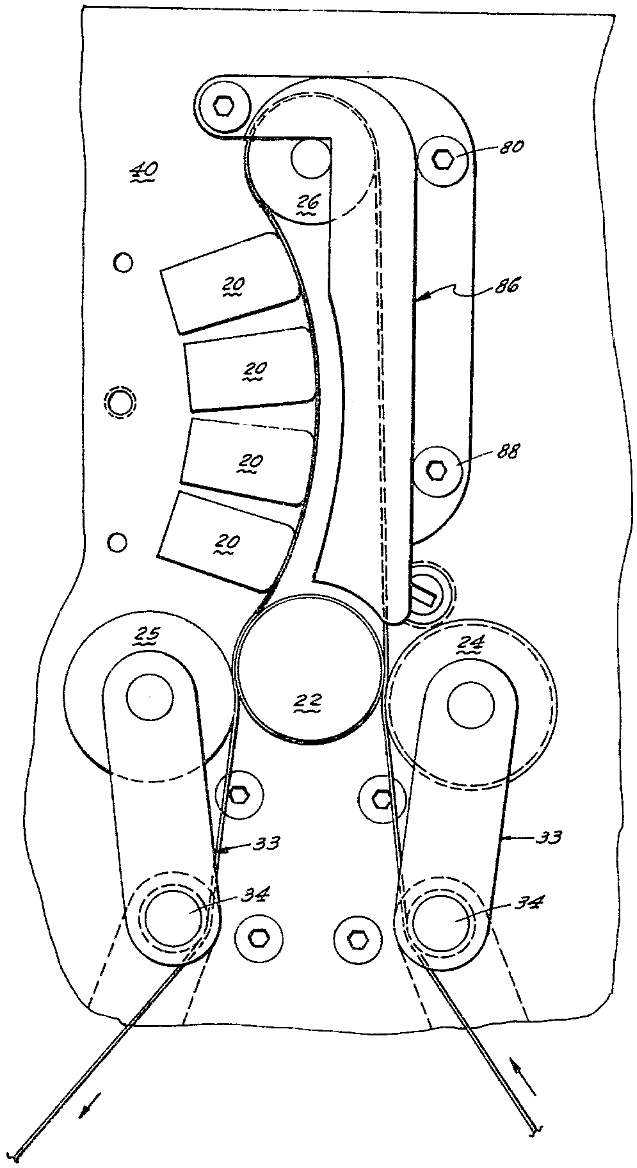
FIG. 1 is a fragmentary plan view of a tape-transport mechanism embodying a selected practice of the invention.

FIG. 1 shows how a traveling magnetic tape, designated T, is unwound from a pay-out reel (not shown) and is formed into a tensioned loop in a well-known manner with one side or run of the loop adjacent a transducing station or zone where four transducer heads 20 contact the tape for recording and reproducing signals. The tensioned loop is formed by a power-driven capstan 22 with the assistance of a pair of pucks or nip rollers 24 and 25 and with the cooperation of an idler roller 26.

The ingoing tape passes between the capstan 22 and the ingoing nip roller 24 which cooperate to drive the tape at a given constant rate. After passing around the idler roller 26, the loop of tape is engaged by the capstan and the outgoing nip roller 25 which cooperate to drive the tape at a slightly faster rate and thereby create and maintain tension in the tape loop. From the outgoing nip roller 25 the tape passes to the usual take-up reel (not shown).

Any one of various known arrangements may be used for causing the capstan and the two nip rollers to drive the tape in the desired differential manner. In this particular embodiment of the invention the capstan and the nip rollers cooperate in the manner indicated in FIG. 3.

Figures 3, 4, 5:
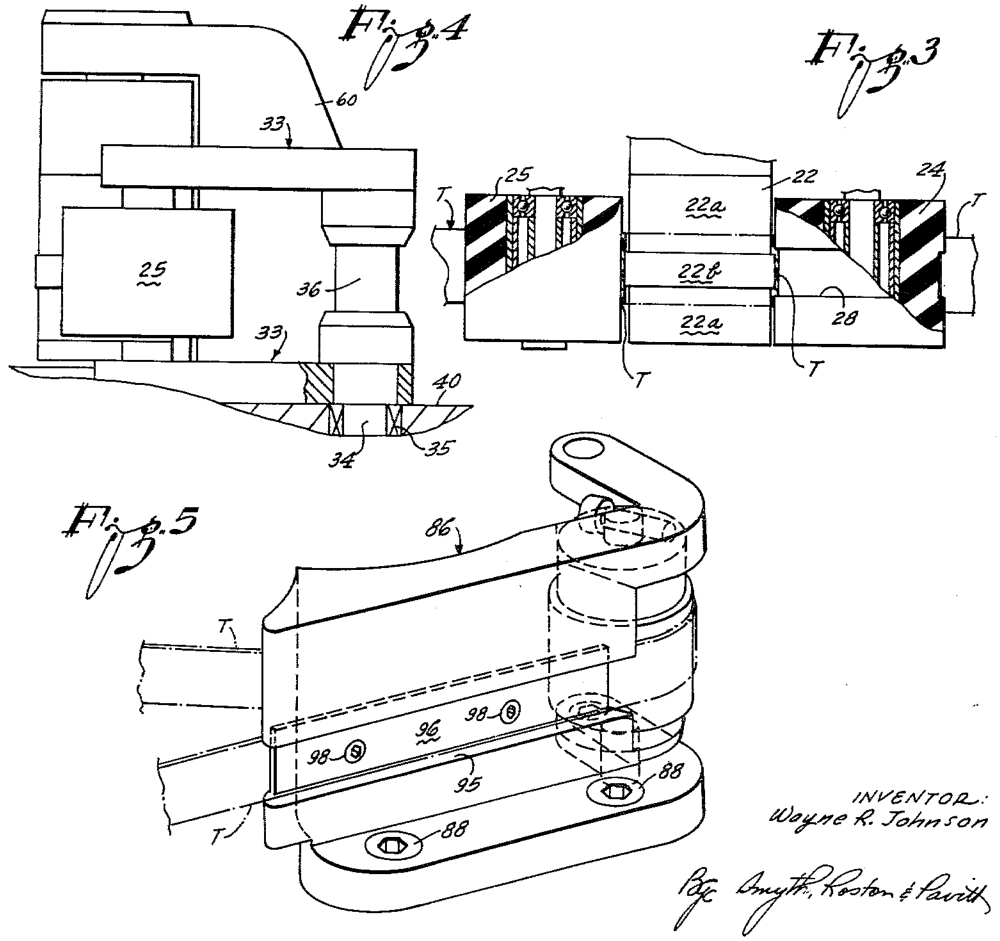
FIG. 3 is a fragmentary view partly in side elevation and partly in section showing the capstan and the associated pair of nip rollers.
FIG. 4 is a fragmentary view partly in section and partly in side elevation showing the manner in which a nip roller is mounted for cooperation with the drive capstan.
FIG. 5 is a perspective view of a tape guide that is associated with the tensioned loop of tape.

In FIG. 3 the capstan 22 is in the form of a cylinder with a relatively rough surface for effective frictional engagement with the tape and for this purpose the metal surface of the capstan may be coated with tungsten by a flame-spraying process. The peripheral surface of the capstan is divided into three sections, namely, two opposite end sections 22*a* of the same diameter and a mid-section 22*b* of slightly increased diameter.

The ingoing nip roller 24 has a thick cylindrical wall of suitable elastomeric material which is formed with a circumferential groove 28 which is wide enough and deep enough to provide ample clearance with respect to the mid-section 22*b* of the capstan 22. Thus the ingoing nip roller straddles the enlarged mid-section 22*b* of the capstan, the two opposite end portions of the nip roller registering with the end sections 22*a* of the capstan. The outging nip roller 25 which also has a thick cylindrical wall of suitable elastomeric material, is of uniform diameter and thus cooperates with only the enlarged mid-section 22*b* of the capstan.

It is apparent in FIG. 3 that since the ingoing nip roller 24 presses the tape T against only the two sections 22*a* of the capstan, the ingoing nip roller cooperates with the capstan to drive the tape at the peripheral speed of the two end sections of the capstan. On the other hand, since the outgoing nip roller 25 presses the tape against only the enlarged mid-section 22*b* of the capstan, the outgoing roller causes the tape to travel at the greater peripheral speed of the mid-section 22*b*. It is the difference between these two peripheral speeds caused by the different diameters of the capstan that causes the tape to be maintained under tension.

Each of the two nip rollers 24 and 25 is mounted by bearings between the two arms of a yoke 33 that is fixedly mounted on a corresponding rocker shaft 34, the rocker shaft being journalled in suitable bearings 35. In the construction shown, each rocker shaft 34 carries a spool-shaped guide 36 for the traveling tape, the guide being mounted between the two arms of the yoke 33. The rocker shaft 34 may be actuated in any suitable manner known to the art for example, the two rocker shafts 34 may be controlled by corresponding solenoids (not shown) which, when energized, swing the two yokes 33 towards the drive capstan 22 to urge the two nip rollers 24 and 25 into pressure contact with the capstan.

All of the working parts of the tape-transport mechanism are carried by a heavy metal base block 40 to minimize undesirable relative movement among the working parts. Journalled in a large bore 42 in the base block by bearing means including a pair of ball bearings 44 is a drive shaft 45 which carries the drive capstan 22. The outer races of the ball bearings 44 are fixedly confined between a spacer sleeve 48 and a screw-threaded retainer bushing 50 which may be tightened in the large bore 42 for clamping action on the outer races of the bearings.

The capstan 22 is in the form of a metal cylinder, the upper end of which is engaged by a cap 52 that is secured to the upper end of the drive shaft 45 by a suitable screw 54. The lower end of the capstan cylinder 22 is engaged by a bushing 55 on the drive shaft 45. The bushing 55 abuts the inner races of the ball bearings 44 and the inner races in turn abut a suitably buttressed spacer sleeve 56. It is apparent that tightening the screw 54 against the cap 52 creates axial pressure against the bushing 55 which is transmitted through the inner races of the ball bearings to the spacer sleeve 56.

It is contemplated that the drive shaft 45 will be journalled at relatively widely spaced points in the bore 42 of the base block 40 and for this purpose a second pair of roller bearings (not shown) may be mounted in the bore at a suitable distance below the pair of ball bearings 44. An additional bearing is desirable, however, to give maximum stability to the upper end of the shaft above the drive capstan 22. It is exceedingly difficult to mount three spacer bearings rigidly in precise axial alignment and it is not practical to attempt to do so where axial alignment is highly critical. This problem is met by floatingly mounting the third bearing.

Figure 2:
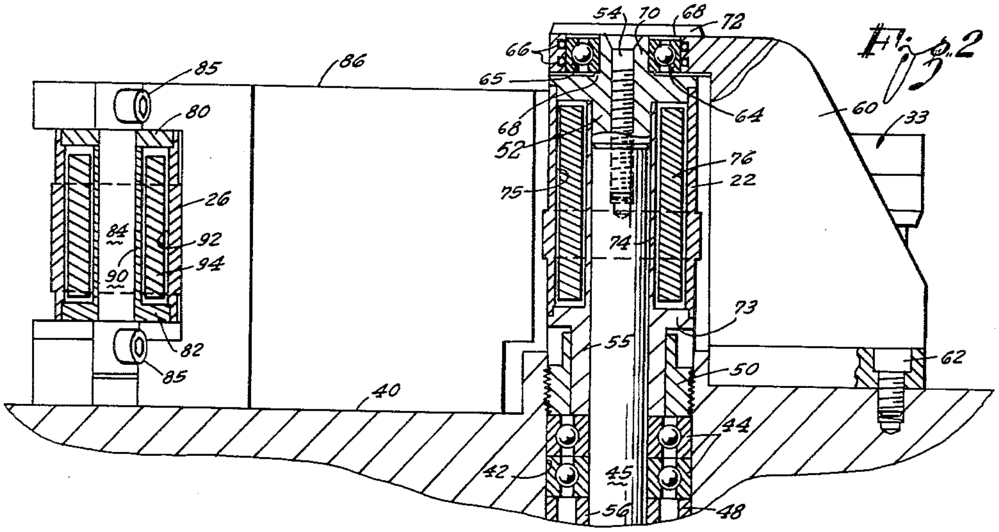
FIG. 2 is a sectional view showing the capstan drive together with associated mechanism including an idler roller.

In the construction shown in FIGS. 1 and 2 a bracket 60 in the form of a heavy block of metal is rigidly mounted on the base block 40 by a plurality of screws 62, the block overhanging the end of the drive shaft 45. The overhanging portion of the bracket block 60 is formed with a circular opening 64 in axial alignment with the large bore 42 in which the drive shaft is mounted. The outer race of a ball bearing 65 is mounted in the circular opening 64 of the bracket block by a pair of surrounding elastomeric O-rings 66 which seat in corresponding inner circumferential grooves in the bearing block. The inner race of the ball bearing 65 abuts an annular shoulder 68 of the previously mentioned cap 52 on the end of the drive shaft and embraces a hub 70 that is integral with the cap. The outer race of the ball bearing is retained in the circular opening 64 by a suitably secured circular cover plate 72.

The cylindrical capstan 22 is provided with suitable internal damping. For this purpose the cylindrical capstan is joined in a fluid-tight manner at its upper end to the cap 52 and at its lower end is joined in a fluid-tight manner to a flange 73 of the bushing 55 and the bushing 55 is formed with a thin walled sleeve 74 which extends along the drive shaft 45 and is connected in a fluid-tight manner to the cap 52. Thus the capstan cylinder in combination with the cap 52 and the bushing 55 forms a concentric annular chamber 75. An annular metal damping body 76 of high specific gravity is mounted in the annular chamber 75 in a freely rotatable manner and for this purpose is immersed in a liquid which preferably is a silicone fluid of high viscosity to form a film for supporting the damping body and for keeping the damping body out of contact with the inner surface of the annular chamber.

The idler roller 26 is also provided with suitable internal damping. In the construction shown, the idler roller is in the form of a cylinder that is clamped between a pair of disks 80 and 82, the two disks being journalled on a fixed shaft 84. The opposite ends of the shaft 84 are secured by diametrical screws 85 to a tape guide 86 which in turn is secured to the base block 40 by suitable screws 88 (FIG. 1).

The idler roller cylinder 26 is joined to the two disks 80 and 82 in a fluid-tight manner and the disk 82 is formed with an integral thin-walled sleeve 90 which joins the disk 80 in a fluid-tight manner. Thus the idler roller cylinder, together with the two disks forms a concentric annular chamber 92. Here again an annular metal damping body 94 is mounted in the annular chamber 92 in a freely rotatable manner and for this purpose is immersed in silicone fluid of sufficiently high viscosity to form a film for supporting the damping body and keeping the damping body out of contact with the inner surfaces of the chamber.

The tape guide 86 which is a metal body of the configuration shown in FIGS. 1 and 5 is formed with a smooth longitudinal channel 95 on one side which slidingly confines the ingoing run of the tensioned loop of the tape T. This guide channel terminates tangentially of the peripheral surface of the idler roller 26 and preferably is lined with a highly polished plate 96 that is secured to the tape guide by suitable screws 98. The tape guide 86 is spaced away from the outgoing run of the tensioned tape loop as may be seen in FIG. 1 to permit the four transducer heads 20 to deflect the tape T as shown, for the purpose of making intimate contact with the tape.

Figures 6, 7, 8:
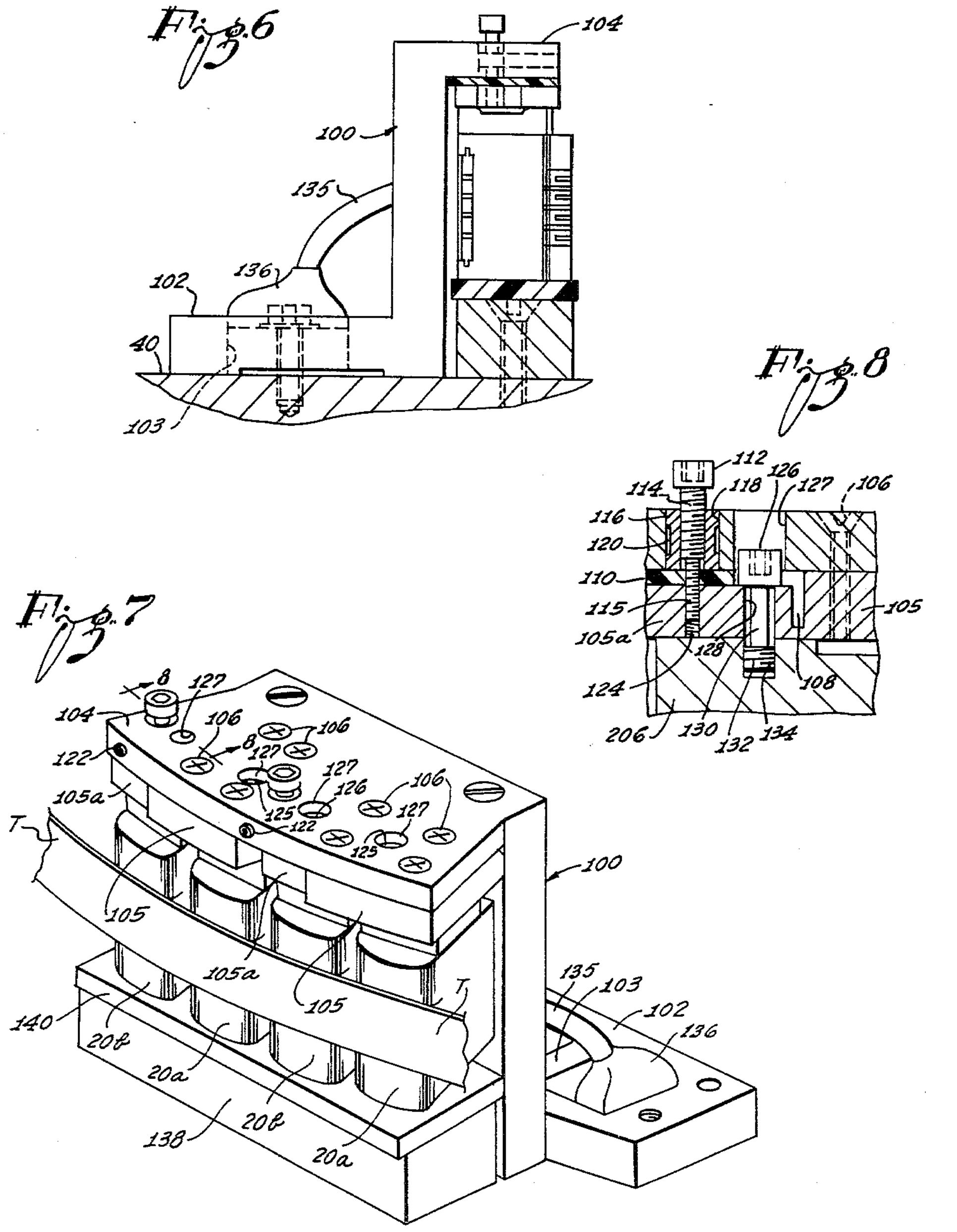
FIG. 6 is a view partly in end elevation and partly in section of a structure for mounting the transducer heads at the transducer station.
FIG. 7 is a perspective view of the same structure.
FIG. 8 is a fragmentary sectional view somewhat enlarged taken as indicated by the lines 8—8 of FIG. 7.

The four transducer heads 20 may be mounted on the base block 40 in the manner illustrated by FIGS. 6, 7 and 8. In FIGS. 6 and 7 a heavy metal bracket 100 has a base flange 102 which rests on the base block 40 and has a second opposite flange 104 which overhangs the four transducer heads 20. The base flange 102 is provided with parallel slots 103 to receive suitable mounting screws (not shown) whereby the bracket 100 may be adjusted as required for positioning the transducer heads in correct relation to the traveling tape.

The four transducer heads include two recording heads 20*a* and two reproducing heads 20*b* and it is contemplated that the two reproducing heads 20*b* will be mounted on the bracket 100 in such manner that the reproducing heads may be adjustably inclined in the plane of the adjacent traveling tape.

In the construction shown in the drawings, two metal plates 105 are fixedly mounted on the underside of the overhanging flange 104 of the bracket 100, each of the two plates being fixedly anchored by four screws 106. As indicated in FIG. 8, an end portion 105*a* of each of the two metal plates 105 is reduced in thickness and is formed with a transverse slot 108 whereby the end portion may function as a tongue which may be flexed by virtue of the slot. As shown in FIG. 8, a layer 110 of elastomeric material of low resilience is interposed between each tongue 105*a* and the overhanging flange 104 of the mounting bracket 100. A suitable adjustment screw 112 extends through the elastomeric layer 110 into threaded engagement with the tongue 105*a* for flexural adjustment of the tongue.

In the construction shown, the shank of the screw 112 has a first portion 114 of relatively large diameter and relatively coarse pitch and a second portion 115 of smaller diameter and finer pitch. The first portion 114 of the screw shank threads into a bushing 116 in a bore 118 in the overhanging bracket flange 104. The bushing 116 may be formed with a circumferential groove 120 for releasable anchorage by a transverse set screw 122 (FIG. 7). The second portion 115 of the screw shank threads into a threaded bore 124 in the tongue 105*a*.

It is apparent that the adjustment screw 112 functions with a differential thread action since rotation of the screw causes the screw to move axially in the bushing 116 at one rate and causes the second portion 115 of the screw to move axially in the bore 124 at a lesser rate. Turning the screw 112 clockwise causes the screw to advance relative to the bushing 116 and causes the second portion 115 to flex the tongue 105*a* downward at a lesser rate. Thus the adjustment screw 112 functions, in effect, as a fine pitched screw for line adjustment of the flexure of the tongue 105*a*.

Each of the two recording transducer heads 20*a* is fixedly mounted on the underside of the fixed body portion of the corresponding metal plate 105 by a corresponding screw 125, and each of the alternate reproducing heads 20*b* is suitably mounted on the corresponding adjustable flexible tongue 105*a* to be adjusted in inclination by the corresponding adjustment screw 112.

Each of the two reproducing heads 20*b* may be secured by a screw 126 in the manner shown in FIG. 8. The overhanging bracket flange 104 has a bore 127 to clear the socket head of each of the screws 126, the socket head abutting the upper side of the corresponding tongue 105*a*. The screw 126 extends through a bore 128 in the tongue 105*a* and the screw is formed with a long neck 130 which is of substantially smaller diameter than the diameter of the bore 128 to permit divergence of the screw relative to the angle of the bore. The lower end of the screw 126 has an enlarged threaded portion 132 which screws into a corresponding threaded bore 134 in the corresponding reproducing transducer head 20*b*. It is apparent that the screw 126 clamps the transducer head 20*b* against the undersurface of the flexible tongue 105*a* regardless of the degree of flexure of the tongue and thus causes the transducer head to be inclined in accord with the flexure of the tongue. The transducer heads are connected to insulated wires 135 which lead to a plug fitting 136.

Suitable damping means may be mounted under the four transducer heads. In the construction shown, a metal spacer block 138 is mounted on the surface of the base block 40 and a layer 140 of elastomeric material is interposed under appropriate compression between the spacer block and the ends of the transducer heads. The layer 140 is made of relatively "dead" elastomer, i.e., an elastomer of relatively low resilience for relatively high damping effectiveness.

The manner in which the invention serves its purpose of providing a "dead" zone in the traveling tape at the transducer zone may be understood from the foregoing description. It is to be noted that disturbances originating in the take-up reel are cut off from the zone of the transducer heads 20 by the contact of the traveling tape with the corresponding guide 36 associated with the corresponding yoke 33 and by the gripping of the tape by the capstan 22 and the cooperating outgoing nip roller 25. Disturbances originating in the pay-out reel are damped in the same manner by the corresponding guide 36 and the clamping of the traveling tape by the capstan 22 in cooperation with the ingoing nip roller 24. In addition, the fixed tape guide 86 serves as a further barrier to disturbances originating in the pay-out reel.

It is to be noted that the capstan 22 and the outgoing nip roller 25 do not distort the outgoing run of the traveling tape at the outgoing end of the transducer zone but, in contrast, the capstan 22 in cooperation with the ingoing nip roller 24 distorts the tape substantially in transverse configuration. As a result of the distortion of the traveling tape at the ingoing end of the tension loop, there is a troublesome strong tendency for disturbances to be created at this point and there is a tendency for the traveling tape to skew away from the desired path along the ingoing run of the tape loop, i.e., where the tape travels from the periphery of the capstan 22 to the idler roller 26. This difficulty is met by the confinement of the ingoing run of tensioned tape by the guide channel 95 of the tap guide 86. The guide channel effectively maintains the tape on the desired path and keeps the tape effectively centered with respect to the idler roller 26. Thus the fixed tape guide 86 in cooperation with the idler roller 26 completely removes any erratic behavior of the ingoing tape by the time that the tape reaches the transducer zone.

The drive capstan 22 is in contact with the traveling tape at the outgoing end of the transducer zone but the capstan 22 is effectively stabilized because of the damping action by the annular damping body 76 and the damping action of the O-rings 66 at the upper ball bearing 65. The O-rings dampen out vibration of the upper end of the drive shaft 45 on which the capstan 22 is mounted and the annular damping body 76 effectively opposes departures of the traveling tape from a constant speed.

If for any reason there is any tendency for the drive capstan 22 to accelerate, the consequent relative rotation between the capstan and the enclosed damping body 76 is opposed by the resistance in shear of the thin films of damping fluid interposed between the damping body and the walls of the chamber 75 in which the damping body is mounted. On the other hand, if there is any tendency for the drive capstan 22 to decelerate, the resistance in shear of the damping fluid to relative motion between the damping body and the capstan causes compensating transfer of force from the rotating damping body to the capstan. In like manner, the confined submerged damping body 94 inside the idler roller 26 effectively maintains constant speed of the idler roller.

Further assurance that the transducer zone of a traveling tape will be a quiescent steady-state zone is provided by the damping means associated with the four transducer heads. It is to be noted that the lower layer 140 of elastomeric damping material is in pressure communication with all four of the transducer heads to combat vibration of the heads. In addition the elastomeric layers 110 are in pressure communication with the tongues 105*a* at the upper ends of the two transducer heads 20*b*.

The description in specific detail of the selected embodiment of the invention will suggest various changes, substitutions and other departures from the disclosure within the spirit and scope of the appended claims.

I claim:

1. In a tape-transport mechanism wherein a rotary means in the form of a drive capstan cooperates with a rotary means in the form of an idler roller to form a loop of traveling tape having an ingoing run from the capstan to the idler roller and an outgoing run from the idler roller to the capstan with nip rollers cooperating with the capstan to place the loop under tension and with a transducer station along one of said two runs of the tape, means to stabilize said one of the two runs of the tape, said stabilizing means including:

damping means incorporated in the internal structure of the drive capstan to stabilize rotation thereof;

damping means incorporated in the internal structure of the idler roller to stabilize rotation thereof; and a fixed guide extending along the other of said two runs of the tape to confine the tape accurately to a linear path and thus prevent skewing of the tape, said damping means in each of said rotary means comprising a concentric chamber formed by the rotary means and a concentric weight immersed in a liquid in the chamber with thin portions of the liquid interposed between the weight and the inner surface of the chamber to prevent contact between the weight and the chamber, said thin portions acting in shear to retard acceleration of the rotary means relative to the weight and to transmit driving force from the weight to the rotary means when the rotary means lags relative to the rotation of the weight.

2. In a tape-transport mechanism wherein a drive capstan driven by a constant speed motor cooperates with an idler roller on an idler roller shaft to form a loop of traveling tape having an ingoing run from the capstan to the idler roller and an outgoing run from the idler roller to the capstan, with nip rollers cooperating with the capstan to place the loop under tension and with a transducer station along one of said two runs of the tape, means to stabilize said one run of the two runs of the tape, said stabilizing means including:

wall means fixedly mounted on said shaft comprising an inner cylindrical wall around the idler roller shaft, an outer cylindrical wall and two end walls, said outer cylindrical wall being the outer peripheral wall of the idler roller, said walls forming an annular chamber concentric to the axis of the shaft;

a concentric annular weight in said chamber with thin clearance spaces between the annular weight and the inner surfaces of the chamber; and a body of liquid in the chamber in said clearance spaces preventing contact between the weight and the chamber, said liquid acting in shear to retard acceleration of the idler roller relative to the weight and transferring driving force from the weight to the idler roller when the idler roller lags relative to the rotation of the weight.

3. Stabilizing means as set forth in claim 2 which includes a fixed guide extending along the other of said two runs of the tape to confine the tape accurately to a predetermined path.

4. In a transport mechanism wherein a drive capstan mounted on a constant speed drive shaft cooperates with an idler roller mounted on an idler shaft to form a loop of traveling tape having an ingoing run from the capstan to the idler roller and an outgoing run from the idler roller to the capstan with nip rollers cooperating with the capstan to place the loop under tension and with a transducer station along one of said two runs of the tape, means to stabilize said one of the two runs of the tape, said stabilizing means including:

wall means fixedly mounted on said drive shaft comprising an inner cylindrical wall embracing the drive shaft, an outer cylindrical wall and two end walls, said outer cylindrical wall being the peripheral wall of the drive capstan, said walls forming an annular chamber concentric to the axis of the shaft;

a concentric annular weight loosely mounted in said chamber;

a body of liquid in said chamber spacing the weight from the surface of the chamber, said liquid acting in shear to retard acceleration of the drive capstan relative to the weight and to transmit driving force from the weight to the capstan when the capstan lags relative to the rotation of the weight;

wall means fixedly mounted on said idler shaft comprising an inner cylindrical wall surrounding the idler shaft, an outer cylindrical wall and two end walls, said outer cylindrical wall being the peripheral wall of the idler roller, said walls forming a second annular chamber concentric to the axis of the idler shaft;

a second concentric annular weight loosely mounted in said second chamber; and a body of liquid in said second chamber spacing the second weight from the surface of the second chamber, said liquid acting in shear to retard acceleration of the idler roller relative to the second weight and to transmit driving force from the second weight to the idler roller when the idler roller lags relative to the rotation of the second weight.

5. Stabilizing means as set forth in claim 4 which includes a fixed guide forming a channel between the capstan and the idler roller to confine the other of said two runs of the tape to a predetermined path.

6. In a tape-transport mechanism wherein a drive capstan driven by a constant speed motor cooperates with an idler roller on an idler roller shaft to form a loop of traveling tape having an ingoing run from the capstan to the idler roller and an outgoing run from the idler roller to the capstan, with nip rollers cooperating with the capstan to place the loop under tension and with a transducer station along one of said two runs of the tape, means to stabilize said one run of the two runs of the tape, said stabilizing means including:

a concentric annular chamber inside the idler roller surrounding said shaft;

a concentric annular weight loosely confined in said chamber; and a body of liquid in said chamber serving as sole means for spacing the weight from all of the inner surfaces of the chamber, said liquid acting in shear to retard acceleration of the idler roller relative to the weight and to transmit driving force from the weight to the idler roller when the idler roller lags relative to rotation of the weight.

7. In a transport mechanism wherein a first means in the form of a drive capstan mounted on a constant speed drive shaft cooperates with a second means spaced therefrom to form a loop of traveling tape having an ingoing run from the capstan to the second means and an outgoing run from the second means to the capstan with nip rollers cooperating with the capstan to place the loop under tension and with a transducer station along one of said two runs of the tape, means to stabilize said one of the two runs of the tape, said stabilizing means including:

a concentric annular chamber inside said capstan surrounding the shaft;

a concentric annular weight loosely fitted in said chamber; and a body of liquid in said chamber forming films of liquid serving as sole means for spacing the weight from all of the walls of the chamber, the films of liquid acting in shear to oppose acceleration of the chamber relative to the weight and to accelerate the rotation of the chamber when the chamber lags behind the rotation of the corresponding weight.

8. Stabilizing means as set forth in claim 7 which includes a fixed guide forming a channel between the capstan and the idler roller to confine the other of said two runs of the tape to a predetermined path.

9. In a tape-transport mechanism wherein a first means in the form of a drive capstan cooperates with a second means to form a loop of traveling tape having an ingoing run from the capstan to the second means and an outgoing run from the second means to the capstan with nip rollers cooperating with the capstan to place the loop under tension and with a transducer station along one of said two runs of the tape, means to stabilize said one of the two runs of the tape, said stabilizing means including:

a concentric chamber inside the drive capstan;

a concentric weight in said chamber; and a body of liquid in said chamber serving as sole means for spacing the weight from the surfaces of all of the walls of the chamber, said liquid acting in shear to retard acceleration of the chamber relative to the weight and to accelerate the rotation of the chamber when the chamber lags behind the rotation of the weight.

10. Stabilizing means as set forth in claim 9 which includes a fixed guide forming a channel between the capstan and the second means to confine the other of the two runs of the tape.

11. In a tape-transport mechanism wherein a rotary means in the form of a drive capstan cooperates with a rotary means in the form of an idler roller to form a loop of traveling tape having an ingoing run from the capstan to the idler roller and an outgoing run from the idler roller to the capstan with nip rollers cooperating with the capstan to place the loop under tension and with a transducer station along one of said two runs of the tape, means to stabilize said one of the two runs of the tape, said stabilizing means including:

a concentric chamber inside the idler roller;

a concentric weight in said chamber;

a body of liquid in said chamber spacing the weight from the inner surfaces of the chamber, said liquid acting in shear to retard acceleration of the chamber relative to the weight and to accelerate the rotation of the chamber when the chamber lags behind the rotation of the weight;

a second concentric chamber inside the capstan;

a second concentric weight in said second chamber; and a body of liquid in said second chamber spacing the second weight from the inner surfaces of the second chamber, said liquid acting in shear to retard acceleration of the second chamber relative to the second weight and to accelerate the rotation of the second chamber when the second chamber lags behind the rotation of the second weight.

References Cited by the Examiner

UNITED STATES PATENTS

| | | | |
|---|---|---|---|
| 2,013,109 | 9/1935 | Reynolds | 226—181 |
| 2,819,069 | 1/1958 | Isom | 226—60 |
| 2,928,312 | 3/1960 | Helvey et al. | 226—60 X |
| 3,003,772 | 10/1961 | Snow et al. | 274—23 |
| 3,100,071 | 8/1963 | Neff | 226—176 |
| 3,121,347 | 2/1964 | Ramsey | 74—574 |

M. HENSON WOOD, Jr., *Primary Examiner.*

ANDRES H. NIELSEN, SAMUEL F. COLEMAN, *Examiners.*